United States Patent
Diamond et al.

(10) Patent No.: US 12,479,432 B1
(45) Date of Patent: Nov. 25, 2025

(54) PRE-DEPARTURE TRAILER BASED ATTACHMENT DETECTION SYSTEM

(71) Applicant: Ford Global Technologies, LLC, Dearborn, MI (US)

(72) Inventors: Brendan F. Diamond, Naples, FL (US); Keith Weston, Canton, MI (US); John Robert Van Wiemeersch, Novi, MI (US); Stuart C. Salter, White Lake, MI (US); Rudi Todd Ansbacher, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/951,830

(22) Filed: Nov. 19, 2024

(51) Int. Cl.
  *B60W 30/18* (2012.01)
  *B60W 10/10* (2012.01)
  *B60W 10/18* (2012.01)
  *B60W 50/14* (2020.01)

(52) U.S. Cl.
  CPC ...... *B60W 30/18009* (2013.01); *B60W 10/10* (2013.01); *B60W 10/18* (2013.01); *B60W 50/14* (2013.01); *B60W 2050/146* (2013.01); *B60W 2300/14* (2013.01); *B60W 2420/403* (2013.01); *B60W 2420/54* (2013.01); *B60W 2540/215* (2020.02); *B60W 2556/45* (2020.02); *B60W 2710/1005* (2013.01); *B60W 2710/18* (2013.01)

(58) Field of Classification Search
  CPC ............ B60W 10/10; B60W 10/18; B60W 30/18009; B60W 50/14; B60W 2540/215; B60W 2556/45; B60W 2050/146; B60W 2300/14; B60W 2420/403; B60W 2420/54; B60W 2710/1005; B60W 2710/18
  See application file for complete search history.

(56) References Cited

U.S. PATENT DOCUMENTS

| | | | |
|---|---|---|---|
| 4,132,093 A * | 1/1979 | McDorman, Sr. | B62D 53/085 70/231 |
| 9,233,710 B2 | 1/2016 | Lavoie et al. | |
| 9,374,562 B2 | 6/2016 | Trombley et al. | |
| 9,723,274 B2 | 8/2017 | Lavoie | |
| 9,981,690 B2 | 5/2018 | Lavoie et al. | |
| 10,407,970 B2 | 9/2019 | Lavoie et al. | |
| 10,628,690 B2 | 4/2020 | Herman et al. | |
| 11,040,588 B2 | 6/2021 | Niewiadomski et al. | |
| 11,215,958 B1 | 1/2022 | Turntine | |
| 11,390,254 B2 | 7/2022 | Pursifull | |
| 11,904,778 B2 | 2/2024 | Joseph et al. | |
| 2019/0210418 A1 | 7/2019 | Hall et al. | |
| 2019/0347498 A1 | 11/2019 | Herman et al. | |
| 2019/0391590 A1 * | 12/2019 | Niewiadomski | B60D 1/06 |
| 2022/0371199 A1 | 11/2022 | Schultz et al. | |
| 2023/0153745 A1 | 5/2023 | Patnaik et al. | |
| 2023/0331298 A1 * | 10/2023 | Alghooneh | B60W 50/14 |
| 2024/0190672 A1 | 6/2024 | Boerger et al. | |
| 2024/0321105 A1 * | 9/2024 | Medinei | G08G 1/167 |

* cited by examiner

*Primary Examiner* — Edwin A Young
(74) *Attorney, Agent, or Firm* — Lorne Forsythe; Price Heneveld LLP

(57) ABSTRACT

A vehicle is configured to be connected to a trailer. The vehicle is configured to detect connections of the trailer to utility infrastructure. Movement of the vehicle is moderated if physical utility connections are present.

19 Claims, 3 Drawing Sheets

PRE-DEPARTURE TRAILER BASED ATTACHMENT DETECTION SYSTEM

FIELD OF THE DISCLOSURE

The present disclosure generally relates to a vehicle, and in particular to a vehicle having a system that moderates movement of the vehicle if a trailer that is connected to the vehicle is attached to infrastructure.

BACKGROUND OF THE DISCLOSURE

Motor vehicles may be configured to tow trailers. The trailers may be connected to infrastructure through connections that provide water, electricity, sewage, data communications, etc. when a trailer is at a campsite or the like.

SUMMARY OF THE DISCLOSURE

An aspect of the present disclosure is a vehicle including a hitch or other suitable structure that is configured to connect a trailer to the vehicle. The vehicle includes a system that is configured to utilize sensor data to determine if a trailer and/or an item on the trailer and/or an item associated with the trailer that is connected to the vehicle is also physically connected to infrastructure. The system is configured to moderate movement of the vehicle and/or provide an alert to a user if a trailer that is connected to the vehicle is also physically connected to infrastructure.

Embodiments of the first aspect of the present disclosure can include any one or a combination of the following features:

The sensor data may comprise at least one of camera data and/or radar data and/or LIDAR data and/or ultrasonic sensing and/or macro capacitive sensing.

The sensor data may be from a sensor that is disposed on the vehicle and/or a sensor that is disposed on the trailer.

The sensor data may include utility connection data indicative of a physical connection of the trailer to utility infrastructure.

The utility connection data may comprise one or more of voltage and/or electric current and/or electrical power data and/or electrical communication data and/or a liquid conduit connection.

The utility connection data may comprise water pressure data indicative of a physical connection of the trailer to a water supply conduit.

Moderating movement of the vehicle may comprise actuating vehicle brakes and/or actuating trailer brakes and/or moderating a transition from PARK to DRIVE and/or PARK to REVERSE and/or PARK to NEUTRAL of a vehicle drive train.

The system may be configured to determine if the trailer is physically connected to infrastructure if a user inputs a control request to the vehicle indicating that the user desires to move the vehicle.

The system may be configured to determine if a trailer is connected to the hitch or other structure when the vehicle is stationary utilizing sensor data and/or user input.

The system may be configured to require a user override or a user confirmation that the trailer is not physically connected to infrastructure before the system enables unmoderated movement of the vehicle.

The vehicle may include a display that is configured to identify the status of physical connections of the trailer to infrastructure.

The system may be configured to: 1) utilize camera data to determine if hitch chains are present; and 2) alert a user and/or moderate movement of the vehicle if a trailer is connected to the vehicle and hitch chains are present but the hitch chains do not interconnect the vehicle to the trailer.

The system may be configured to: 1) utilize sensor data to determine if a person has been working around a zone to connect an under-chassis device; 2) record the person disconnecting the under-chassis device; and 3) moderate movement of the vehicle if a person has not disconnected the under-chassis device.

The sensor data may comprise audio data from a microphone, and the system may be configured to moderate movement of the vehicle if a device requiring disconnection to enable vehicle movement has not been disconnected from the trailer.

Another aspect of the present disclosure is a vehicle including a drivetrain and a system that is configured to determine if a trailer is connected to the vehicle. The system may be configured to: 1) utilize a force required to move the trailer and/or sensor data to determine if a tire of a trailer that is connected to the vehicle has engaged an obstruction; and 2) alert a user of the obstruction and/or moderate movement of the vehicle if a tire of the trailer has engaged an obstruction.

Embodiments of the second aspect of the present disclosure can include any one or a combination of the following features:

The system may be configured to: 1) determine an expected drivetrain force required to move the trailer, and 2) inform a user that an obstruction is present if a drivetrain force exceeds the expected drivetrain force according to predefined criteria.

The expected drivetrain force may be determined, at least in part, using vehicle and/or trailer weight and/or estimated surface grade and/or terrain.

The system may be configured to utilize image data from a camera to determine if a tire of the trailer has engaged an obstruction.

The system may be configured to wirelessly communicate with a tag of a wheel chock and determine a location of the wheel chock relative to a tire of the trailer.

Another aspect of the present disclosure is a method of controlling a vehicle that is connected to a trailer. The method includes determining that the trailer is physically connected to infrastructure in a manner that limits movement of the trailer relative to the infrastructure. The method further includes alerting a user and/or moderating movement of the vehicle if the trailer is physically connected to infrastructure in a manner that limits movement of the trailer relative to the infrastructure.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
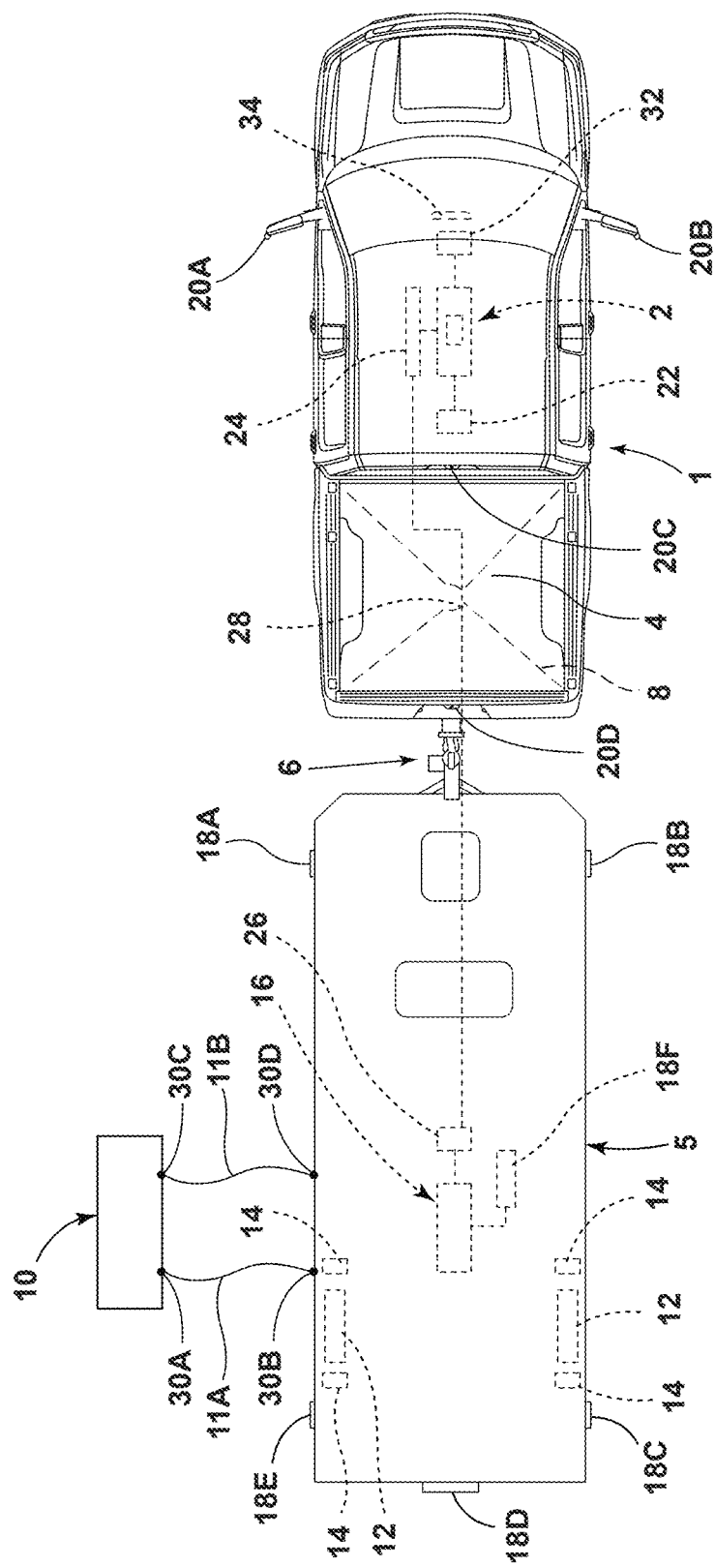
FIG. 1 is a partial schematic top plan view of a vehicle and trailer according to an aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the terms "or" and "and/or," when used in a list of two or more items, means that any one of the listed items can be employed by itself, or any combination of two or more of the listed items can be employed. For example, if a composition or device is described as containing or comprising components A, B, or C, the composition or device can contain (include) A alone; B alone; C alone; A and B in combination; A and C in combination; B and C in combination; or A, B, and C in combination. If a composition or device is described as containing or comprising components A and/or B and/or C, the composition or device can contain (include) A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," "including" or any other variation thereof, are intended to cover a non-exclusive inclusion, such that a process, method, article, or apparatus that includes or comprises a list of elements does not include only those elements but may include other elements not expressly listed or inherent to such process, method, article, or apparatus. An element preceded by "comprises . . . a" or "includes . . . a" does not, without more constraints, preclude the existence of additional identical elements in the process, method, article, or apparatus that comprises the element.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIG. 1, a vehicle 1 may include a control system 2 that is configured to utilize sensor data to determine if a trailer 5 is connected to vehicle 1 utilizing a structure such as a hitch 6. Control system 2 may be configured to determine if trailer 5 is physically connected to infrastructure 10. Trailer 5 may comprise a camping trailer that is configured to be operable connected to infrastructure 10. Infrastructure 10 may comprise a "RV Hookup" in the form of a post, pad, or other fixed structure that includes connections to provide one or more of electricity (e.g. "shore power"), water (e.g. "city water"), sewage, TV and/or communication connections (e.g. internet access via a cable or other "hard line") at a campground, RV park, or other facility. Control system 2 is configured to moderate movement of the vehicle 1 and/or provide an alert to a user if a trailer 5 that is connected to the vehicle 1 is also physically connected to infrastructure 10. It will be understood that control system 2 may comprise a plurality of interconnected units and controllers that are configured to provide for control of the vehicle powertrain, trailer backup assist, various electrical components, etc., and the control system of the present disclosure is not limited to a specific configuration.

Trailer 5 and/or vehicle 1 may be physically connected to infrastructure 10 by one or more utility lines 11A, 11B, etc. The utility lines 11A and 11B may comprise, for example, electrical power lines, water supply lines (e.g. a potable water hose), sewage lines or hoses, data lines or the like that provide power, water, and sewage service for trailer 5 when trailer 5 is, for example, positioned at a campsite or other such facility. In general, the utility lines provide for transfer of matter (liquid, solids, etc.) and/or transfer of power and/or data between infrastructure 10 and/or trailer 5 and/or vehicle 1. Chocks or blocks 14 may be positioned adjacent tires 12 of trailer 5 to moderate movement of trailer 5 when trailer 5 is disconnected from vehicle 1.

Trailer 5 may include one or more sensors 18A-18F that are operably connected to a communication device 16 that is configured to communicate with control system 2 of vehicle 1 utilizing wireless signals, hard lines, or other suitable arrangements. It will be understood that sensors 18A-18F may be positioned at virtually any suitable location of trailer 5, and the locations shown in FIG. 1 are merely examples of a possible configuration. One or more of the sensors 18A-18F may comprise cameras, and vehicle 1 may also include one or more sensors such as cameras 20A-20D. One or more of cameras 18A-18F and/or cameras 20A-20D may be configured to provide images of infrastructure 10 and/or lines 11A and 11B, and the camera data from the trailer cameras may be communicated to vehicle control system 2 utilizing a communication device 16 of the trailer. Vehicle control system 2 may be configured to use the camera image data to determine via, for example, a controller that is configured to process camera images (or other suitable vision system) if trailer 5 is connected to infrastructure 10 by lines 11A, 11B, etc.

One or more of the sensors 18A-18F of trailer 5 may comprise a pressure sensor that detect a pressure of water or other liquid associated with one or more utility lines 11A, 11B, etc. One or more of the sensors 18A-18F may comprise electric power, voltage, or electric current detectors that are capable of determining if one or more of the utility lines 11A, 11B constitutes a power line that is operably connected to an electrical power supply of infrastructure 10. Infrastructure 10 may optionally provide signals or the like that enable vehicle control system 2 to determine if trailer 5 and/or vehicle 1 are connected to infrastructure 10. For example, infrastructure 10 may include an electrical charger that sends out pulses over a trailer and/or a vehicle charging cable (e.g. utility line 11A, 11B) to enable the vehicle 1 to recognize vehicle 1 and/or trailer 5 and/or an item on or associated with trailer 5 and/or vehicle 1 is attached to infrastructure 10 by a utility line. Infrastructure 10 may optionally pulse pressure of fluids associated with the utility lines to provide a signal to enable the vehicle 1 to recognize that it and/or trailer 5 and/or an item on trailer 5 and/or on vehicle 1 and/or associated with trailer 5 and/or associated with vehicle 1 is physically attached to infrastructure 10.

Referring again to FIG. 1, control system 2 of vehicle 1 may be configured to receive data from one or more sensors such as cameras 20A-20D of vehicle 1. Control system 2 may also be configured to receive data from additional sensors 22 of vehicle 1. Sensors 22 may comprise, for example, one or more of radar and/or LIDAR sensors and/or sensors that are configured to determine if trailer 5 is physically connected to infrastructure 10. For example, an electrical system 24 of vehicle 1 may be operably connected to an electrical system 26 of trailer 5 via electrical lines 28, whereby control system 2 of vehicle 1 receives data concerning the electrical system 26 of trailer 5. Control system 2 of vehicle 1 can utilize the data concerning the electrical system 26 of trailer 5 to determine if trailer 5 is connected to vehicle 1 and to determine if trailer 5 is connected to an electrical power supply of infrastructure 10 by one or more lines 11A and/or 11B, etc. One or more sensors may also be provided at connection points 30A-30D of lines 11A and/or 11B to infrastructure 10. The sensors at locations 30A-30D may comprise, for example, a switch or other suitable feature that indicates the status of a connection of lines 11A and/or 11B to infrastructure 10. One or more of the sensors of vehicle 1 and trailer 5 (FIG. 1) may comprise microphones that are configured to detect sound adjacent to vehicle 1 and/or trailer 5.

Referring again to FIG. 1, vehicle 1 may include a drivetrain 32 that is operably connected to control system 2. The drivetrain 32 may comprise, for example, a motor, a transmission, and/or vehicle brakes. The vehicle drivetrain 32 may have PARK and DRIVE configurations whereby a user can select PARK to moderate movement of vehicle 1 and select DRIVE, REVERSE, or NEUTRAL to enable (provide for) movement of vehicle 1. Trailer 5 may also include trailer brakes that may be operably connected to the vehicle control system 2.

Figure 2:
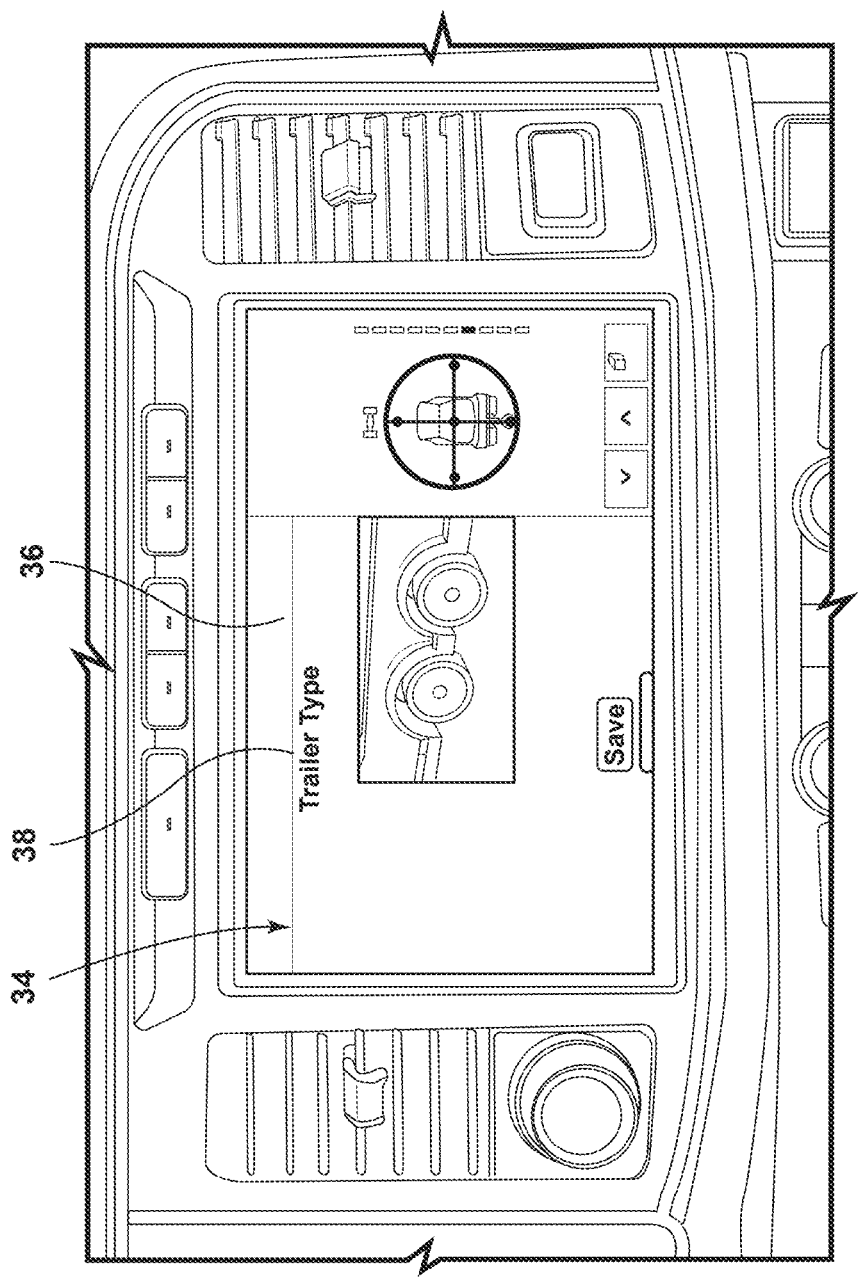
FIG. 2 is a partially fragmentary view of a human machine interface (HMI)

With reference to FIGS. 1 and 2, vehicle 1 may include a human machine interface (HMI) 34 which may include a display screen 36 and one or more microphones and/or speakers. Vehicle control system 2 may be configured to provide alerts, prompts, and/or other communication to a user in the form of images 38 (FIG. 2), audio signals, or the like. HMI 34 may also include user input features whereby a user can provide inputs concerning trailer 5 and/or vehicle 1. Control system 2 may also be configured to communicate with a mobile device such as a smart phone or watch of a user whereby the mobile device provides HMI features or HMI 34 may be available on an exterior surface of the vehicle or trailer.

Figure 3:
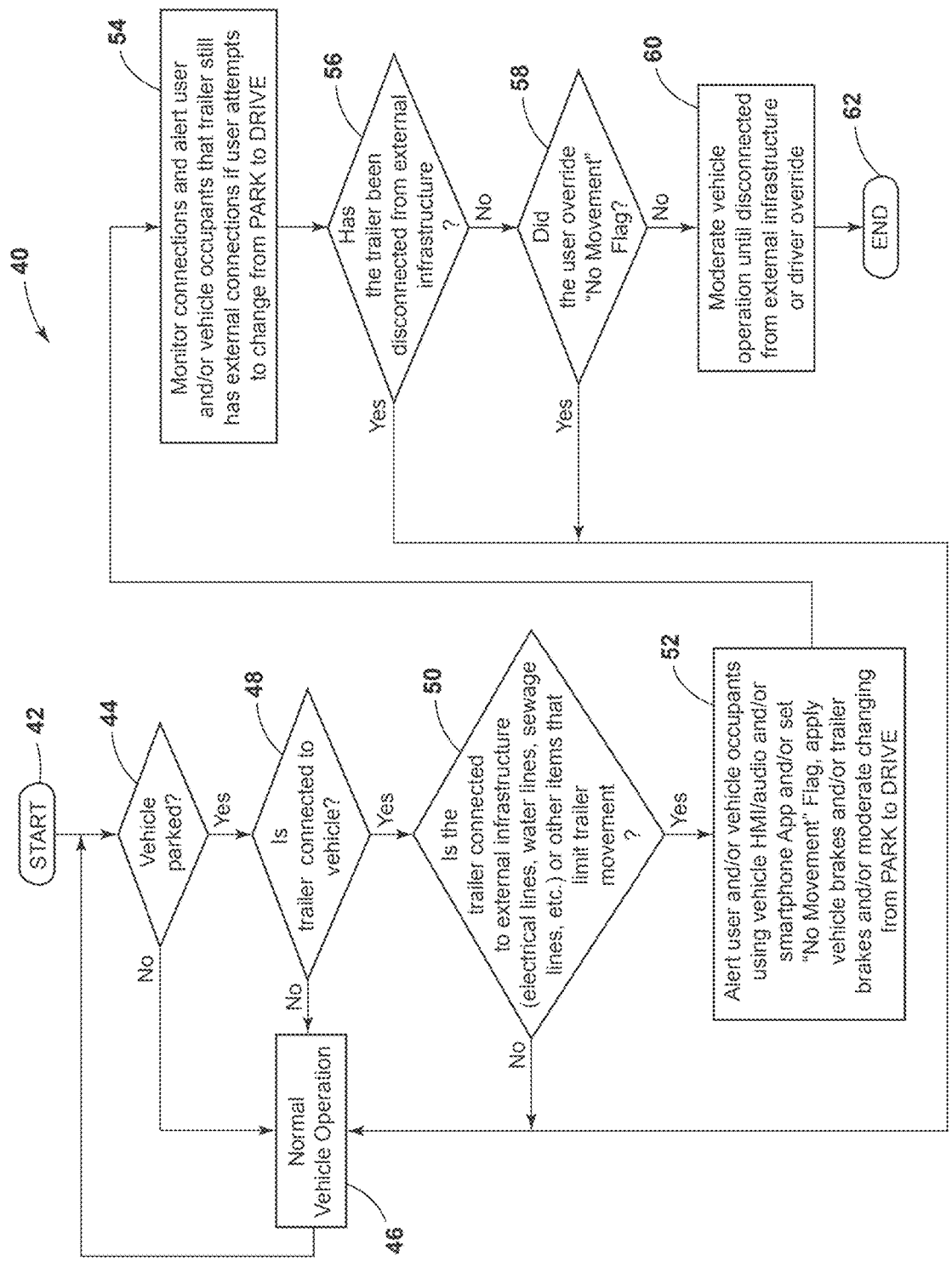
FIG. 3 is a flow chart.

With further reference to FIG. 3, vehicle 1 may be configured to implement a process 40 to moderate movement of vehicle 1 if a trailer 5 is connected to infrastructure 10. Process 40 begins at step 42 and proceeds to step 44. At step 44, the process enables (provides for) normal vehicle operation (step 46) if the vehicle is not parked. However, if the vehicle is parked at step 44, the process continues to step 48. At step 48, the process determines if a trailer is connected to the vehicle. If a trailer is not connected, normal vehicle operation 46 is enabled. However, if a trailer is connected to a vehicle at step 48, the process continues to step 50. The process may optionally include determining if vehicle 1 is physically connected to infrastructure by one or more utility lines or the like. For example, one or both of vehicle 1 and trailer 5 may be connected to infrastructure, or vehicle 1 may not be connected a trailer, but vehicle 1 may nevertheless be connected to infrastructure. The process may also include determining if an item on the trailer 5 and/or on vehicle 1 and/or an item associated with the trailer 5 and/or associated with vehicle 1 is physically connected to infrastructure by a utility line or the like.

At step 50, the process determines if the trailer and/or vehicle is connected to external infrastructure by utility lines such as electrical lines, water lines, sewage lines, etc. or other items (connections) that limit trailer and/or vehicle movement. In general, step 50 may involve determining if the trailer 5 (and/or vehicle 1) is physically connected to external infrastructure 10 (FIG. 1) by a utility line or other item that physically limits movement of trailer 5 and/or vehicle 1. If the trailer 5 (and/or vehicle 1) is not connected to external infrastructure at step 50, the process enables (provides for) normal vehicle operation (step 46). However, if the trailer 5 (and/or vehicle 1) is connected to external infrastructure at step 50, the process continues to step 52. At step 52, the user is alerted using the HMI 34 (FIG. 2) and/or vehicle audio and/or a mobile device (e.g. a smart phone app). At step 52, a "No Movement" Flag may also be set to indicate that vehicle movement is being moderated. The process may also apply vehicle brakes and/or trailer brakes at step 52, and the drivetrain of the vehicle may be moderated from changing out of PARK (e.g. moderated from changing from PARK to DRIVE and/or PARK to REVERSE, and/or PARK to NEUTRAL).

After step 52, the process continues to step 54. At step 54, the connections to external infrastructure are monitored, and the user may be alerted (e.g. via HMI 34) that the trailer 5 (and/or vehicle 1) still has external connections if the user attempts to move the vehicle (e.g. by changing from PARK to DRIVE).

The process then continues to step 56. If the trailer 5 (and/or vehicle 1) has been disconnected from the external infrastructure 10 at step 56, normal vehicle operation (step 46) is enabled. However, if the trailer (and/or vehicle 1) has not been disconnected from external infrastructure 10 at step 56, the process continues to step 58. At step 58, the system determines if the user provided an override of the "No Movement" Flag. If a user did override the "No Movement" Flag at step 58, the process enables (provides for) normal vehicle operation (step 46). However, if a user did not override the "No Movement" Flag at step 58, the process continues to step 60. At step 60, the system moderates vehicle operation until the trailer 5 (and/or vehicle 1) is disconnected from the external infrastructure 10 or a driver override is present. The process then ends at step 62.

In general, when vehicle 1 is parked, vehicle 1 will determine if trailer 5 is attached using the exterior sensor suite (e.g. sensors 20A-20D; FIG. 1), user input, electrical connections from vehicle 1 to trailer 5, and/or other indicators. Vehicle 1 may also determine if connections (e.g. via utility lines) to external infrastructure 10 are present utilizing one or more trailer-based sensors 18A-18F. The trailer-based sensors may comprise electrical power, electrical voltage, electrical current, water pressure, and/or other sensors that are operably connected to the infrastructure 10. Upon engine start/key on, the vehicle 1 can detect the connection to trailer 5 utilizing electrical and/or hitch connections. The electrical connections may be monitored utilizing an electrical continuity check using voltage and current sensors of vehicle 1. If the electrical connector locations (to infrastructure 10) are viewable from the vehicle 1 sensor suite, cameras can also be used to monitor the electrical connections. If a connection of trailer 5 to infrastructure 10 is present, a multimedia system (e.g an "Infotainment System") or feature of vehicle 1 could trigger a connection to a trailer app on a mobile device, which may reference the attached systems and remind the user to check for disconnections (e.g. of utility lines or the like) before moving vehicle 1 with trailer 5 (and/or vehicle 1) attached to infrastructure 10. The trailer 5 (and/or vehicle 1) connection determination may be based, at least in part, on load estimates of weight in the bed 4 of vehicle 1, suspension displacement, and/or other factors indicative of a trailer being connected to vehicle 1.

Once the vehicle 1 determines that the vehicle is attached to a trailer 5, the vehicle and trailer may use their combined sensor suite (e.g. vehicle 1 may access cameras of trailer 5). The combined sensor suite may include cameras, radar, LIDAR, ultrasonics, capacitive sensing as well as connection statuses for both trailer 5 and vehicle 1 (if available) to determine if trailer 5 is connected to infrastructure 10 by utility connections such as electrical, water, sewage, etc. connections. When one or more of these infrastructure connections are identified, vehicle 1 may apply one or both of the vehicle and/or trailer brakes (e.g. parking brakes) to moderate movement of vehicle 1. In general, the identification of such connections may be made when the vehicle 1 and trailer 5 are first parked and connected to infrastructure 10.

If a user requests vehicle 1 to be driven (e.g. by switching the gear selector (GSM) from PARK to DRIVE), the vehicle 1 and/or trailer 5 may then determine if these connections are still present using the exterior sensor suite of vehicle 1 and/or trailer 5 and/or the connection status. If the connections to the external infrastructure are still present, vehicle 1 may moderate transition from PARK to another position or state (e.g. DRIVE) and/or inform the user and/or vehicle occupants that the trailer 5 (and/or vehicle 1) needs to be disconnected from the infrastructure 10. The communication to the user and/or vehicle occupants may be accomplished utilizing vehicle HMI 34, audio feedback, an app of a portable device and/or other suitable communication devices. Once the connections of trailer 5 (and/or vehicle 1) to infrastructure 10 have been disconnected as specified by a user or based on sensor-based factors, or via a user-provided override (e.g. using HMI 34), vehicle 1 may then be operated without moderation of vehicle movement.

Referring again to FIG. 1, the vehicle 1 may also be configured to determine if vehicle chocks 14 are in place adjacent to tires 12 of trailer 5. In general, vehicle 1 may be configured to determine a pull force to detect tire chocks or blocks 14. For example, the pull force may be estimated utilizing mass of vehicle 1 and/or trailer 5 and/or throttle position and/or speed. If a torque required to move vehicle 1 and trailer 5 is greater than an expected pull force, control system 2 may determine that chocks or blocks 14 are present. The expected pull force may be based on the weight of vehicle 1 and/or trailer 5 and/or an estimated grade or terrain.

Vehicle 1 may also utilize data from cameras and/or other sensors to determine that one or more trailer tires 12 have engaged or are engaging a tire chock or block 14. For example, sensors 20A and 20B of vehicle 1 (FIG. 1) may comprise sideview mirror cameras. Images from the sideview mirror cameras may be utilized to monitor the location of the trailer tires 12 relative to wheel chocks 14. If the tire 12 of trailer 5 and/or chock 14 are not within the field of view of the cameras 20A and 20B (and/or other sensors), vehicle 1 may be configured to utilize the resultant movement of trailer 5 and/or tires 12 to detect the presence of a chock 14. For example, if the trailer tires 12 move up and down in a manner that is not consistent with the contour of the ground surface adjacent to tires 12, the vehicle 1 may determine that the wheel chocks 14 were not removed.

Also, a BLUETOOTH® and/or Ultra-Wideband tag or other suitable tag or wirelesss device or feature may be integrated into the wheel chocks 14, and the location of the chocks 14 may be determined using signal triangulation to determine if the wheel chock 14 is adjacent to a tire 12 of trailer 5.

Vehicle 1 may also be configured to provide a coordinated trailer backup assist whereby vehicle 1 moves trailer 5 a specified distance (e.g. one foot) either way to get around chocks 14 or other obstructions to determine if chocks 14 are present. If a chock 14 is detected (e.g. due to trailer movement that is inconsistent with the contour of the surface at the tires of the trailer), the user may be instructed to remove the chock 14 before driving vehicle 1. Vehicle movement may also be moderated if a chock 14 is detected and a user has not confirmed removal of the chock 14.

Vehicle 1 may also include tailgate cameras that may be utilized to determine if hitch chains and/or bed tiedown chains 8 (FIG. 1) are present and connected/disconnected. For example, sensor 20C of vehicle 1 may comprise a Center High Mounted Stop Lamp (CHMSL), which may include a camera that is capable of generating images of bed 4 of vehicle 1. Thus, if trailer 5 comprises a fifth wheel or gooseneck connection that utilizes tiedown chains 8, image data from sensor 20C may be utilized to determine if the tiedown chains 8 are connected to the trailer or loose (disconnected from the trailer). The connected/disconnected state of chains 8 may be utilized to determine if movement of vehicle 1 should be moderated. The status of the tiedown chains 8 may also be utilized to generate an alert to a user concerning the state of the chains 8.

Vehicle 1 may also be configured to record a user or attendant working in or around a zone to connect an under-chassis device or the like. Vehicle 1 may also be configured to record a user or attendant disconnecting the under-chassis device. If vehicle 1 does not observe (detect) a person disconnecting the under-chassis device, vehicle 1 may moderate shifting the vehicle out of PARK. Vehicle 1 may optionally be configured to identify under-chassis connections utilizing radar of vehicle 1. Vehicle 1 may optionally utilize data from a microphone that detects sound resulting from securing (connecting) or un-securing (disconnecting) lines 11A and 11B (FIG. 1) or other items from vehicle 1 and/or trailer 5. If an appropriate sound indicating that a disconnection from infrastructure 10 is not detected, vehicle 1 may be configured to alert a user and/or moderate movement (e.g. moderate shifting out of PARK) until a user override and/or disconnection is detected.

As discussed above, vehicle control according to an aspect of the present disclosure may moderate movement of a vehicle 1 if a trailer 5 is connected to infrastructure 10. However, it will be understood that recreational vehicles (RVs) may also utilize connections to external infrastructure 10. Thus, the present disclosure is not limited to a vehicle 1 and trailer 5, but rather includes detecting connections to infrastructure 10 by an RV, and moderating movement of the RV if such connection are detected.

Such operations described herein should always be implemented and/or performed in accordance with the owner's manual and safety guidelines.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a structure configured to connect a trailer to the vehicle;
a system that is configured to utilize sensor data to determine if the trailer connected to the vehicle is physically connected to the utility infrastructure; and
wherein the system is configured to moderate movement of the vehicle and/or provide an alert to a user if the trailer connected to the vehicle is physically connected to utility infrastructure.

2. The vehicle of claim 1, wherein:
the sensor data comprises at least one of camera data and/or radar data and/or LIDAR data and/or ultrasonic sensor data and/or capacitive sensing.

3. The vehicle of claim 2, wherein:
the sensor data is from a sensor that is disposed on the vehicle and/or the trailer and/or the utility infrastructure.

4. The vehicle of claim 1, wherein:
the sensor data comprises utility data indicative of a physical connection of the trailer and/or the vehicle and/or an item on the trailer and/or an item on the vehicle to the utility infrastructure by utility lines.

5. The vehicle of claim 4, wherein:
the utility data comprises one or more of voltage and/or electric current and/or electrical power data and/or electrical communication data and/or a liquid conduit connection.

6. The vehicle of claim 5, wherein:
the utility data comprises water pressure data indicative of a physical connection of the trailer to a water supply conduit.

7. The vehicle of claim 1, wherein:
moderating movement of the vehicle comprises actuating vehicle brakes and/or actuating trailer brakes and/or moderating a transition out of PARK by a vehicle drive train.

8. The vehicle of claim 7, wherein:
the system is configured to determine if the trailer is physically connected to the utility infrastructure if the user inputs a control request to the vehicle indicating that the user desires to move the vehicle.

9. The vehicle of claim 1, wherein:
the system is configured to determine if the trailer is connected to the structure when the vehicle is stationary utilizing sensor data and/or user input.

10. The vehicle of claim 1, wherein:
the system is configured to require a user override or provide a user confirmation that the trailer and/or vehicle are not physically connected to the utility infrastructure before the system enables unmoderated movement of the vehicle.

11. The vehicle of claim 1, wherein:
the vehicle includes a display that is configured to identify status of physical connections of the trailer to infrastructure.

12. The vehicle of claim 1, wherein:
the system is configured to: 1) utilize camera data to determine if hitch chains are present; and 2) alert the user and/or moderate movement of the vehicle if the trailer is connected to the vehicle and the hitch chains are present but the hitch chains do not interconnect the vehicle to the trailer.

13. The vehicle of claim 1, wherein:
the system is configured to: 1) utilize sensor data to determine if a person has been working around a zone to connect an under-chassis device; 2) record the person disconnecting the under-chassis device; and 3) moderate movement of the vehicle if the person has not disconnected the under-chassis device.

14. The vehicle of claim 1, wherein:
the sensor data comprises audio data from a microphone; and
the system is configured to moderate movement of the vehicle if a device requiring disconnection to enable vehicle movement has not been disconnected from the trailer.

15. A vehicle comprising:
a drivetrain;
a system that is configured to determine if a trailer is connected to the vehicle;
wherein the system is configured to: 1) utilize a force required to move the trailer and/or sensor data to determine if a tire of a trailer connected to the vehicle has engaged an obstruction; and 2) alert a user of the obstruction and/or moderate movement of the vehicle if the tire of the trailer has engaged the obstruction; and
wherein the system is configured to: 1) determine an expected drivetrain force required to move the trailer, and 2) inform the user that the obstruction is present if a drivetrain force exceeds the expected drivetrain force according to predefined criteria.

16. The vehicle of claim 15, wherein:
the expected drivetrain force is determined, at least in part, using vehicle and/or trailer weight and/or estimated grade and/or terrain.

17. The vehicle of claim 15, wherein:
the system is configured to utilize image data from a camera to determine if the tire of the trailer has engaged the obstruction.

18. The vehicle of claim 15, wherein:
the system is configured to wirelessly communicate with a tag of a wheel chock and determine a location of the wheel chock relative to a tire of the trailer.

19. A method of controlling a vehicle that is connected to a trailer, the method comprising:
determining that the trailer is physically connected to the infrastructure in a manner that limits movement of the trailer relative to the infrastructure; and
alerting a user and/or moderating movement of the vehicle if the trailer is physically connected to the infrastructure in the manner that limits movement of the trailer relative to the infrastructure.

* * * * *